(12) United States Patent
Kurukchi et al.

(10) Patent No.: US 7,772,449 B2
(45) Date of Patent: Aug. 10, 2010

(54) REMOVAL OF ACID GASES AND SULFUR COMPOUNDS FROM HYDROCARBON GAS STREAMS IN A CAUSTIC TOWER

(75) Inventors: Sabah A. Kurukchi, Houston, TX (US); Joseph M. Gondolfe, Cypress, TX (US); Ming Wang, Sugar Land, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 492 days.

(21) Appl. No.: 11/888,449

(22) Filed: Aug. 1, 2007

(65) Prior Publication Data

US 2009/0036727 A1 Feb. 5, 2009

(51) Int. Cl.
*C07C 7/00* (2006.01)
*B01D 53/14* (2006.01)

(52) U.S. Cl. .................. 585/854; 208/81; 208/82; 423/234; 423/243.01; 423/243.08; 95/199; 95/223; 95/235

(58) Field of Classification Search .................. 585/854, 585/860; 208/81, 82
See application file for complete search history.

(56) References Cited

U.S. PATENT DOCUMENTS

| | | | |
|---|---|---|---|
| 2,176,196 A | 10/1939 | Beamer et al. | |
| 2,740,749 A | 4/1956 | Meguerian et al. | |
| 2,921,021 A | 1/1960 | Urban et al. | |
| 4,406,867 A * | 9/1983 | Marcinkowsky et al. | 423/226 |
| 4,562,300 A | 12/1985 | LaFoy | |
| 4,705,620 A | 11/1987 | Bricker et al. | |
| 5,082,987 A | 1/1992 | Olbrich et al. | |
| 5,264,187 A | 11/1993 | Olbrich et al. | |
| 5,434,329 A | 7/1995 | Lehr | |
| 6,235,961 B1 | 5/2001 | Kurukchi | |
| 6,306,288 B1 | 10/2001 | Pittman et al. | |
| 6,352,640 B1 | 3/2002 | Cook et al. | |
| 6,960,291 B2 | 11/2005 | Greaney et al. | |
| 7,332,145 B2 * | 2/2008 | Chretien | 423/573.1 |
| 7,485,275 B2 * | 2/2009 | Asprion et al. | 423/220 |
| 2008/0034789 A1 * | 2/2008 | Fieler et al. | 62/623 |

FOREIGN PATENT DOCUMENTS

| | | |
|---|---|---|
| EP | 1 158 038 A | 11/2001 |
| GB | 1 353 248 A | 5/1974 |
| GB | 2 373 970 | 10/2002 |
| WO | WO 00/44694 | 8/2000 |

OTHER PUBLICATIONS

European Search Report received in corresponding European Patent Application No. EP 2 025 386 A1 dated Nov. 7, 2008.

* cited by examiner

*Primary Examiner*—Tam M Nguyen
(74) *Attorney, Agent, or Firm*—Locke Lord Bissell & Liddell, LLP; Alan B. Clement; Peter J. Fallon

(57) ABSTRACT

The present invention provides a process for treating a hydrocarbon feed gas stream containing acid gases ($CO_2$, $H_2S$ and mercaptans) by contacting the feed gas stream in a multi-section caustic tower, the bottom sections employing a recirculating caustic solution to remove the $CO_2$ and $H_2S$ down to low single digits parts per million concentration and the upper sections employing a stronger caustic solution on a once-through basis to produce a mercaptans depleted gas stream.

18 Claims, 1 Drawing Sheet

REMOVAL OF ACID GASES AND SULFUR COMPOUNDS FROM HYDROCARBON GAS STREAMS IN A CAUSTIC TOWER

FIELD OF THE INVENTION

The present invention relates to a process for removing acid gases and sulfur compounds from hydrocarbon streams. More particularly, the present invention relates to a process for removing acid gases and sulfur compounds from hydrocarbon gas streams in a caustic tower. Most particularly, the present invention relates to removing acid gases and sulfur compounds, including mercaptans, from steam cracker and refinery gases in a multi-stage caustic tower.

BACKGROUND OF THE INVENTION

In the petroleum and petrochemical industries, many hydrocarbon gas streams, such as but not limited to, steam cracker gas, fluidized catalytic cracking (FCC) gas and refinery fuel gas, contain acid gases (compounds such as $CO_2$, $H_2S$ and mercaptans) that require treating for acid gas removal for a variety of reasons. For example, acid gas removal may be required for meeting product specifications, preventing poisoning of downstream catalyst beds, odor control and/or upgrading fuel calorific value.

Bulk acid gas removal is achieved in amine towers and caustic towers are then used to achieve acid compound removals down to low parts per million concentration levels. The removal of $CO_2$ and $H_2S$ from hydrocarbon gas streams is known to be achieved by intimate contact with an aqueous solution of a base, such as sodium hydroxide (NaOH), which is a caustic solution. By reaction with the caustic of the caustic solution, i.e., NaOH, acid gas components, such as hydrogen sulfide and carbon dioxide are converted into sodium sulfide ($Na_2S$), sodium hydrosulfide (NaHS), sodium carbonate ($Na_2CO_3$) and sodium bicarbonate ($NaHCO_3$), which are absorbed into the caustic solution and, thus, removed from the hydrocarbon gas stream.

One type of petrochemical operation wherein an aqueous sodium hydroxide solution almost invariably is used for gas scrubbing is in an ethylene production unit or plant (although others are contemplated by the present invention, a description of the ethylene production unit will be made for simplicity sake). In an ethylene plant, a saturated aliphatic hydrocarbon feed, such as ethane, propane or higher oils, and the like, is heated at high temperatures in the presence of steam to crack the saturated hydrocarbon molecules down to lower molecular weight unsaturated hydrocarbons, such as predominately ethylene, followed by propylene and then various quantities of $C_4$, $C_5$ and $C_6$ mono- and di-olefinic hydrocarbons, with lesser quantities of $C_7$ and higher weight saturated and unsaturated aliphatic, cyclic and aromatic hydrocarbons.

During steam cracking, any sulfur containing compounds added to and/or present in the hydrocarbon feed stream are converted into hydrogen sulfide and/or organically bound sulfur compounds and, also a content of carbon dioxide is generated by a water-gas shift reaction. The resultant gas mixture from steam cracking then is quenched from a temperature ranging from about 700 to about 1000° C. to a lower temperature ranging from about 35 to about 40° C., whereupon the major portion of its water and $C_{7+}$ hydrocarbon content is condensed and separated from the mixture. After quenching, the remaining constituents of the gas mixture conventionally are conditioned by various steps of gas compression and refrigerative cooling to prepare it for cryogenic distillation whereby its ethylene, propylene and butenes content ultimately will be recovered in essentially pure form for ultimate use as monomers in the production of various polymers, such as polyethylene, ethylene copolymers, polypropylene and the like.

One step required to properly condition the gas mixture for cryogenic distillation is to scrub (or otherwise clean) the cracked gas essentially free of any acid components, such as hydrogen sulfide and carbon dioxide. Conventionally, this has been accomplished at some inter-stage location of a multi-stage gas compression system and, on occasion post-compression, wherein the cracked gas stream is at a pressure ranging from about 10 to about 20 atmospheres (atm). The compressed gas stream is contacted with an aqueous sodium hydroxide solution by countercurrent contact in a gas-liquid contact vessel, often referred to in the industry as an "absorber," "scrubber" or "caustic tower." After such gas scrubbing, the aqueous sodium hydroxide solution, which is discharged from the bottom of this tower contains, in addition to some unreacted sodium hydroxide, the sodium sulfide, sodium hydrosulfide, sodium carbonate and sodium bicarbonate that results from the removal of acid gas compounds from the scrubbed gas stream.

To prevent build-up of the concentration of these components in the caustic tower and to provide for hydraulic room to add a quantity of fresh higher strength caustic solution to the caustic tower to make up for the consumption of caustic in the tower, a quantity of this weak or "tower spent" caustic solution is bled away from being recirculated back to the tower. To maintain a proper liquid volume of caustic solution circulation within the tower, however, a portion of this weak or "tower spent" caustic solution is recirculated back to the tower. That quantity of the weak or "tower spent" caustic solution bled away from the tower has been referred to in this art "spent caustic." The spent caustic then is conditioned for environmentally sound disposal in a spent caustic treatment unit.

Some feedstocks to the steam cracker also contain substantial amounts of mercaptans, including relatively heavy mercaptans. These relatively heavy mercaptans largely will decompose to $H_2S$ and hydrocarbons and exit the furnace with the cracked gases, the undecomposed heavy mercaptans and lighter mercaptans. In the quench tower, the heavier mercaptans for the most part will condense and leave with the separated fuel oil, but the lighter mercaptans will end up with the cracked gas leaving the water quench tower for compression and further olefin purification. One of the steps for olefin purification conventionally used in olefin production facilities is acetylene hydrogenation, which typically employs a palladium catalyst. The mercaptans in the cracked gas stream must be substantially removed to prevent poisoning of the palladium catalyst.

The conventional methods for removing mercaptans and other sulfur compounds from the cracked gas stream have entailed the use of regenerable activated alumina adsorbent beds, with adsorbents such as Selexsorb COS, Selexsorb CD and Selexsorb CDX supplied by BASF, or by using non-regenerable catalysts, such as zinc oxide, copper oxide or lead oxide to form zinc sulfide, copper sulfide or lead sulfide, respectively. These commercially available methods, however, have proved very expensive.

Accordingly, it would represent a notable advance in the state of the art if a process for removing mercaptans could be developed, which is more economical than the processes taught in the prior art and which would not require the addition of another process step in addition to the caustic scrubbing.

SUMMARY OF THE PRESENT INVENTION

To this end, the present inventors now have discovered a unique process for removing the mercaptans in the caustic scrubbing tower, which is economical and which sufficiently removes the mercaptans (and other sulfur containing compounds) down to levels low enough to substantially prevent poisoning of the downstream catalyst.

In view of the foregoing, it is an object of the present invention to provide an improved spent caustic removal process.

It is a further object of the present invention to provide an improved process for removing acid gases and sulfur compounds from hydrocarbon gas streams.

It is another object of the present invention to provide an acid gas removal process that is economical.

These and other objects evident to those of ordinary skill in the art are provided by the present invention discussed in detail hereinbelow.

DETAILED DESCRIPTION OF THE INVENTION

Figure 1:
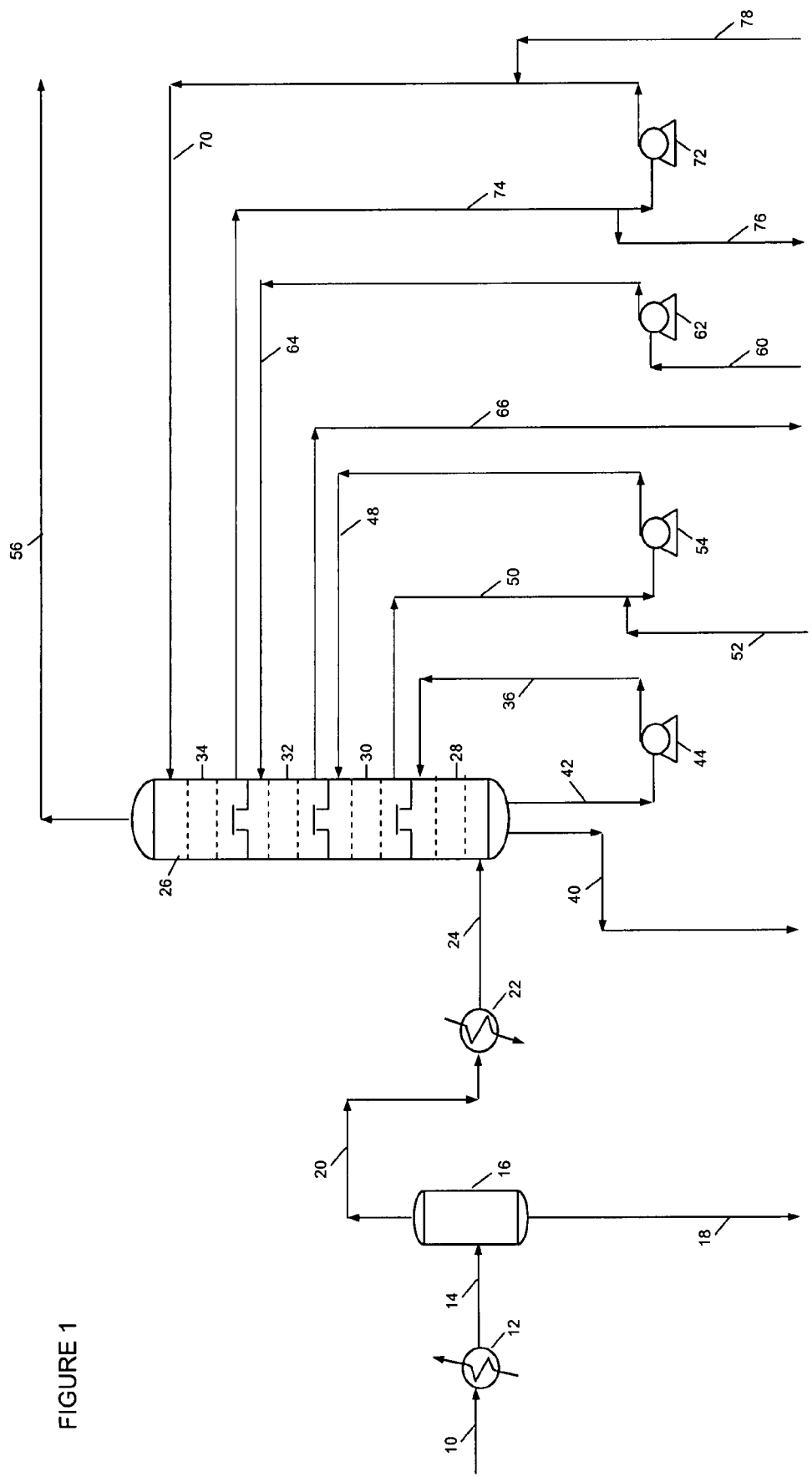
FIG. 1 depicts a preferred embodiment of the present invention.

The present invention provides an improved process for removing acid gases and other sulfur compounds from hydrocarbon gas streams, such as in a caustic tower. Although the process of the present invention may be used in a variety of different processes that require the removal of acid gases and sulfur compounds from hydrocarbon gas streams, for ease of understanding, the present invention will be described in more detail with regard to the processing of a cracked gas stream. In no way, however, should this detailed description limit the scope of the appended claims.

Referring to FIG. 1, a preferred embodiment of the present invention comprises a process for treating a feed hydrocarbon gas stream in a line 10, which in addition to hydrocarbons comprises acid compounds, such as but not limited to, $CO_2$, $H_2S$ and mercaptans. The feed hydrocarbon gas stream can comprise any gas stream containing hydrocarbons and acid compounds from which it is desirable to remove the acid compounds. As non-limiting examples of such feed hydrocarbon gas streams contemplated for use in the practice of the present invention, there are steam cracker gases, fluidized catalytic cracking (FCC) gases, refinery fuel gases, deep catalytic cracking (DCC) gases and other cracking or refinery gases.

Returning to FIG. 1, the feed hydrocarbon gas stream 10 is cooled in a water cooled heat exchanger 12, preferably to a temperature that is 2-3° C. within the available cooling water outlet temperature. The cooled gas in a stream 14 then is fed to a knock out drum 16 for separating condensate liquid removed in a stream 18 (formed during the water cooling) from the vapor, which is removed in a stream 20. The vapor in stream 20 will be saturated with water and hydrocarbons at the temperature it issues from the knock out drum 16. The vapor is then superheated in heat exchanger 22 to a temperature that is at least about 5° C. above the temperature from the knock out drum 16, preferably at a temperature ranging from about 45 to about 60° C. The superheated vapor in a line 24 then is fed to a caustic tower 26.

The caustic tower of this preferred embodiment of the present invention comprises four separate sections, namely, a bottom recirculating caustic section 28, a middle recirculating caustic section 30, a top once-through caustic section 32 and a water wash section 34. The present inventors have found that the use of a multi-stage caustic tower is critical to the process of the present invention, wherein the tower has at least one lower recirculating caustic section and at least one once-through caustic section located above (or downstream) of the recirculating caustic section. Although the inventors do not wish to be bound by any theory, the inventors have recognized that because the reaction between mercaptans (RSH) and NaOH is reversible

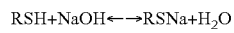
$$RSH+NaOH \leftarrow\rightarrow RSNa+H_2O$$

removal of mercaptans with an untreated recirculating caustic solution, as practiced in the prior art, fails to remove effectively sufficient amounts of mercaptans to prevent downstream processing issues, such as catalyst poisoning. In the bottom recirculation sections of the prior art processes, the RSNa formed when recirculated to the top of the bottom section would meet a gas that is less concentrated with RSH contaminant, which, in turn, would cause the reversal of the reaction and the release of RSH back to the hydrocarbon gas. Accordingly, the present inventors surprisingly have found that use of a once-through caustic section in a multi-stage caustic tower provides a simple and economical solution to this problem (as opposed to the prior art use of downstream regenerable activated alumina adsorbent beds or non regenerable metal oxide catalyst) and, thereby, satisfied a long felt need in the art.

Returning to FIG. 1, the superheated feed gas in a line 24 is fed to the bottom recirculating caustic section 28 of caustic tower 26. A weak or bottom recirculating caustic solution in a line 36 contacts the feed gas, preferably in countercurrent fashion. Trays 38 or packing also may be provided in bottom recirculating caustic section 28 to improve caustic/feed gas contact and mass transfer. The caustic solution is removed either as spent caustic in a line 40 for treatment as is known to those skilled in the art, or in a line 42 for untreated recirculation via pump 44 and recirculation line 36. In this manner, the feed gas stream from line 24, which initially has its highest concentration of acid gas ($CO_2$ and $H_2S$) components, maximizes the utilization of the residual strength of the relatively weak caustic solution in bottom caustic recirculation zone 18.

The caustic solution may comprise any basic reagent which is capable of extracting the acid components and mercaptans from the feed stream. A preferred basic reagent comprises an aqueous solution of ammonia or an alkaline metal hydroxide, such as sodium or potassium hydroxide. Sodium hydroxide solutions especially are preferred.

The partially treated gas rises through vent 46 from the bottom caustic recirculation section 18 to the middle recirculating caustic section 30, which also may be equipped with trays 38 or packing. In the middle recirculating caustic section, the partially treated gas contacts the relatively stronger caustic solution from a line 48, formed from removed untreated caustic stream 50, make up caustic stream 52 and pump 54. The relatively strong caustic used in the middle recirculating caustic section typically will have a caustic concentration ranging from about 2 to about 20 wt %, preferably from about 4 to about 15 wt % and more preferably from about 4 to about 12 wt %. Again, NaOH is the preferred caustic agent. The addition of the fresh make-up caustic via line 52 provides sufficient caustic for removal of the $CO_2$ and $H_2S$ acid compounds to levels desired in the finally treated stream 56, which issues out from the top of tower 26.

The gas from middle caustic recirculating section 30 rises into the top once through caustic section 32 through vent 48.

Top once through caustic section 32 also may contain trays or packing. The caustic for the top once through caustic section 32, unlike the other sections, is not an untreated recirculated caustic (i.e., the untreated recirculated caustics still contain sulfur compounds). Instead, a strong caustic solution, comprising from about 15 to about 50 wt % caustic (preferably NaOH), preferably from about 20 to about 40 wt % and more preferably from about 20 to about 30 wt % caustic in a source line 62 is pumped via pump 62 through line 64 into the upper portion of the top once through caustic section 32, such that the strong caustic solution contacts the gas in the top section in countercurrent fashion, to convert at least about 90% of the mercaptans (RSH) to mercaptides salts (RSNa), which exits the top section 32 via a line 66.

In preferred embodiments, the mercaptide salt containing stream in line 66 can be treated in a conventional caustic regeneration unit (not shown) for oxidation of the RSNa to the alkyl disulfide oil (RSSR) and NaOH. Typically, this mercaptide salt oxidation reaction is effected by contacting the mercaptide salts with air over a suitable catalyst. Suitable catalysts, may include, but are not limited to, metal phthalocyanine catalysts, such as are known to those skilled in the art. Preferably the catalyst comprises a cobalt phthalocyanine or vanadium phthalocyanine. Sulfonated (monosulfo, disulfo, trisulfo and tetrasulfo) or carboxylated derivatives of the metal phthalocyanine catalysts may be employed to provide higher catalytic activity and speed up the oxidation rate. An especially preferred catalyst comprises cobalt phthalocyanine disulfonate. The catalyst concentration will vary depending in part on the level of mercaptides in the alkaline stream, as will be understood by those skilled in the art. Typically, however, the amount of cobalt phthalocyanine disulfonate will range from about 10 to about 1,000 ppm by weight of the alkaline solution. Oxidation conditions can vary in accordance with procedures known to those skilled in the art, but typically a pressure ranging from about 70 to about 1000 psig and a temperature from about ambient to about 100° C. will be employed.

The alkyl disulfide oil (RSSR) can be separated as an organic phase from the aqueous caustic phase, which treated aqueous caustic then can be recycled back to the tower 26 via line 60. This separation can be carried out as will be understood by those skilled in the art, but generally a gravity phase separation zone operating at a pressure ranging from atmospheric to about 300 psig or more, and a temperature ranging from about 10 to about 120° C. will suffice. This may be aided by a coalescing means located in the zone if desired as will be appreciated by those skilled in the art.

The treated gas depleted from acid gases $CO_2$, $H_2S$ and RSH leaves the top once through caustic zone 32 through vent 68 and enters into the water wash section 34. In water wash section 34, the treated gas is washed with water entering via a line 70 in countercurrent fashion to remove entrained caustic from the gas. A pump 72 circulates the water exiting the water wash section via a line 74 for recirculation. A bleed off line 76 from line 74 and a make-up water line 78 for adding make up water to water recirculation line 70 also may be provided.

The fully treated gas leaves tower 26 as an overhead stream in line 56 substantially free of acid components. Thus, the caustic tower 26 provides removal of acid gas components from the feed gas stream 10 to desired levels, such as less than about 5 vppm (vapor parts per million) and preferably less than about 1 vppm, $CO_2$, less than about 1 vppm and preferably less than about 0.1 vppm $H_2S$ and less than about 5 vppm and preferably less than about 2 vppm of mercaptides (RSH).

Many variations of the present invention will suggest themselves to those skilled in the art in light of the above-detailed description. For example, a variety of feedstreams and caustic agents may be employed. All such obvious modifications are within the full-intended scope of the appended claims.

All of the above-referenced patents are hereby incorporated by reference.

We claim:

1. A process for removing acid components from a hydrocarbon containing gas stream, said process comprising:
   (a) feeding a gaseous feed stream comprising hydrocarbons, carbon dioxide, hydrogen sulfide and mercaptans to a caustic recirculation zone in a multi-stage caustic tower, wherein said multi-stage caustic tower has a least one said caustic recirculation zone and at least one once-through caustic zone located downstream of the caustic recirculation zone(s);
   (b) contacting said gaseous feed stream in said at least one caustic recirculation zone with a caustic stream that exits said tower and is recirculated to said tower to remove substantially all of said carbon dioxide and hydrogen sulfide from said gaseous stream and provide a partially treated gaseous stream comprising hydrocarbons and mercaptans;
   (c) passing said partially treated gaseous stream to said at least one once-through caustic zone;
   (d) contacting said partially treated gaseous stream in said at least once-through caustic zone with a caustic solution on a once-through basis to remove substantially all of the mercaptans from said partially treated gaseous stream and produce a product stream substantially free of carbon dioxide, hydrogen sulfide and mercaptans.

2. A process as defined in claim 1 wherein said gaseous feed stream comprises an effluent from a steam cracker.

3. A process as defined in claim 1 wherein said multi-stage caustic tower comprises two caustic recirculation zones.

4. A process as defined in claim 3 wherein the gaseous feed stream is contacted with a first recirculated caustic stream in a first caustic recirculation zone to remove a portion of the carbon dioxide and hydrogen sulfide from said gaseous feed stream to produce a first partially treated gas stream and wherein said first partially treated gas stream is fed to a second recirculated caustic zone for contact with a second recirculated caustic stream to substantially remove remaining carbon dioxide and hydrogen sulfide and produce a second partially treated gas stream.

5. A process as defined in claim 1 wherein said caustic stream in said caustic recirculation zone has a caustic strength less than the strength of the caustic in said once-through caustic zone.

6. A process as defined in claim 1 wherein said caustic employed in said tower is selected from the group consisting of ammonia, sodium hydroxide, potassium hydroxide and mixtures thereof.

7. A process as defined in claim 4 wherein said first recirculated caustic stream comprises sodium hydroxide.

8. A process as defined in claim 7 wherein said second recirculated caustic stream comprises sodium hydroxide.

9. A process as defined in claim 4 wherein said caustic strength of the second recirculated caustic ranges from about 2 to about 20 weight percent.

10. A process as defined in claim 9 wherein said caustic strength of said second recirculated caustic ranges from about 4 to about 15 weight percent.

11. A process as defined in claim 1 wherein said tower comprises one once through caustic zone.

12. A process as defined in claim 11 wherein the once through caustic in said once through caustic zone has a caustic strength ranging from about 15 to about 50 weight percent.

13. A process as defined in claim 12 wherein the once through caustic in said once through caustic zone has a caustic strength ranging from about 20 to about 30 weight percent.

14. A process as defined in claim 1 wherein spent caustic from said once through caustic zone is treated to remove mercaptans and mercaptan salts.

15. A process as defined in claim 14 wherein said spent caustic treatment comprises oxidizing said spent caustic over a catalyst comprising a metal phthalocyanine or derivative thereof to form a dialkyl disulfide oil and then separating the dialkyl disulfide oil from said caustic solution.

16. A process as defined in claim 1 further comprising water washing the product stream from said once-through caustic zone to remove entrained caustic and produce a water washed product stream.

17. A process as defined in claim 1 wherein said product stream comprises less than about 5 vppm $CO_2$, less than about 1 vppm $H_2S$ and less than about 5 vppm mercaptides.

18. A process as defined in claim 17 wherein said product stream comprises less than about 1 vppm $CO_2$, less than about 0.1 vppm $H_2S$ and less than about 2 vppm mercaptides.

* * * * *

UNITED STATES PATENT AND TRADEMARK OFFICE
CERTIFICATE OF CORRECTION

PATENT NO. : 7,772,449 B2  Page 1 of 1
APPLICATION NO. : 11/888449
DATED : August 10, 2010
INVENTOR(S) : Sabah A. Kurukchi et al.

It is certified that error appears in the above-identified patent and that said Letters Patent is hereby corrected as shown below:

Title Page, Item (75) Inventors, rewrite third inventor's first name "Ming" to "Min"

Signed and Sealed this

Twelfth Day of October, 2010

David J. Kappos
*Director of the United States Patent and Trademark Office*